No. 894,188.　　　　　　　　　　　　　　　　PATENTED JULY 28, 1908.
H. CHRISTENSEN.
GANG DISK HARROW.
APPLICATION FILED APR. 23, 1907.
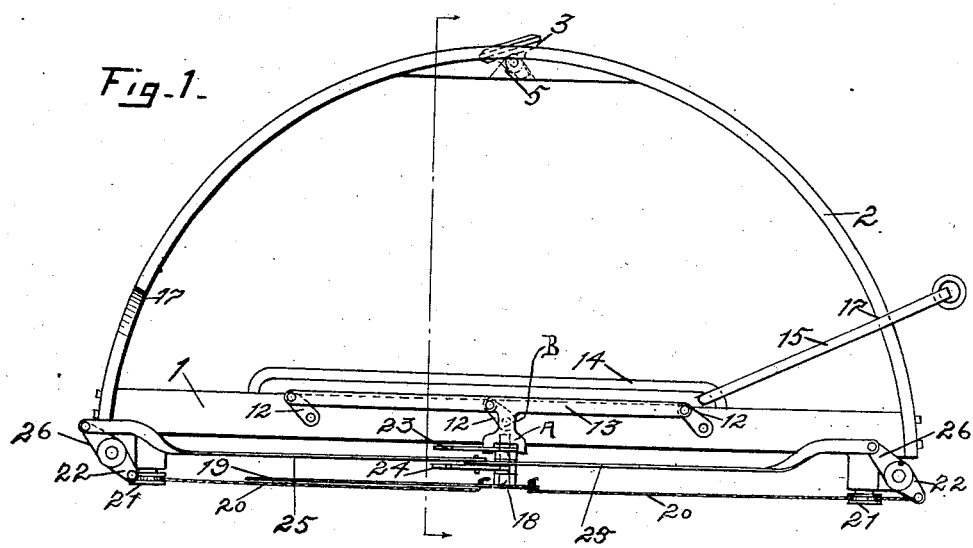
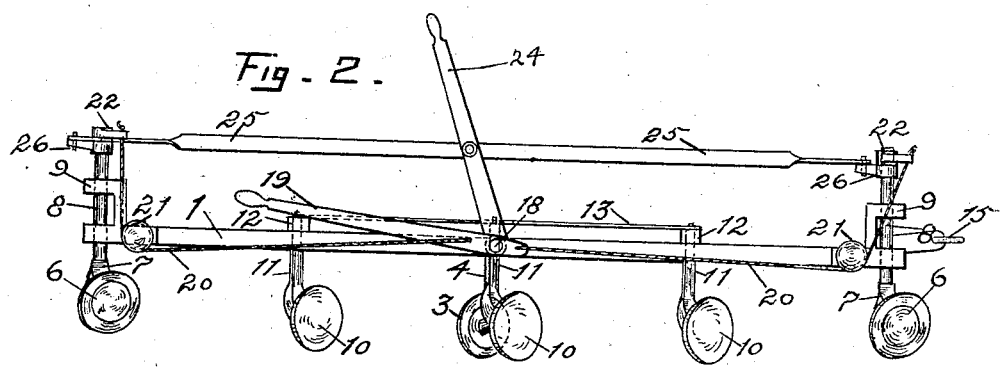
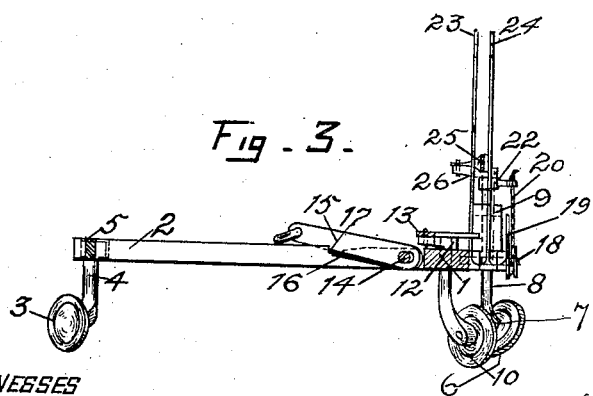
WITNESSES　　　　　　　　　　　　　　INVENTOR
Wm. F. Drew　　　　　　　　　　　　Hans Christensen
Wm. F. Booth　　　　　　　　　　　BY N. A. Acker
　　　　　　　　　　　　　　　　　　　ATTORNEY

UNITED STATES PATENT OFFICE.

HANS CHRISTENSEN, OF BYRON, CALIFORNIA.

GANG DISK HARROW.

No. 894,188.  Specification of Letters Patent.  Patented July 28, 1908.

Application filed April 23, 1907. Serial No. 369,857.

*To all whom it may concern:*

Be it known that I, HANS CHRISTENSEN, a citizen of the United States, residing at Byron, in the county of Contra Costa and State of California, have invented certain new and useful Improvements in Gang Disk Harrows, of which the following is a specification.

The hereinafter described invention relates to an improved cultivating-implement which, on account of the reversibility of its operative parts, is especially adapted for work on side-hills, for the reason that it is enabled to make a return path parallel with and adjacent to the outward course, instead of making a continuous path around the border of the field; and the invention is particularly a reversible gang disk-harrow for side hill work.

The object of the invention is to provide a disk-harrow of simple construction, easily and readily reversible, and effective in operation.

To this end the invention consists in the novel construction, arrangement and combinations of the harrow, which shall be fully described, by reference to the accompanying sheet of drawings in which, Figure 1 is a top plan view of the gang disk-harrow; Fig. 2 is a side view of the harrow in elevation, the position of the parts being for work in the field; and Fig. 3 is a cross sectional end view taken on the line *x*—*x* Fig. 1 of the drawings.

The frame of the harrow, which may be of any suitable construction in detail, is, in its simplest form, composed of the straight carrying-beam 1, and the semicircular bar 2. The outer side of the frame is carried by a colter-wheel 3, the standard 4 of which is suitably pivoted or swiveled in a bearing 5 on the bar 2. The inner side of the frame is carried by the gage-wheels 6, one at each extremity of the beam 1. Each of these wheels 6 is mounted at an angle in a bearing 7 at the base of a standard 8, said standard being both vertically adjustable and axially rotatable in a bearing 9 on the beam 1.

10 are the harrow-disks. There may be any number of these, but, for the sake of illustration, I have here shown three. Each disk is rotatably mounted at the lower end of a standard 11, which passes up through and is rotatably mounted in the beam 1. To the top of each standard 11 is secured a crank-arm 12; and all the crank-arms are connected by a link 13, whereby the standards 11 may be turned on their axes, and all the disks 10 reversed, in unison.

To the inner side of the beam 1 is secured a draft-rail 14, on which is mounted and adapted to slide from end to end, the draft-bar 15. On the under side of the draft-bar is a notch 16 and on the upper side of the frame bar 2, one near each end, is a notch 17, with which the notch 16 of the draft-bar 15 is adapted to engage, whereby said bar is locked in the proper line of draft. These notches are here merely illustrative of any suitable locking device to hold the draft-bar in position, when set for use.

It will be seen that the harrow frame-beam 1 lies at an angle to the line of draft, so that the harrow-disks 10, being mounted in line on the beam, travel in separate paths, thereby cutting a plurality of separate, parallel furrows. The gage wheel 6, at one end, is in line with the adjacent harrow-disk, so that it travels in the furrow made by said disk; and, similarly, the gage wheel 6 at the other end is in line with its adjacent disk, whereby it travels in the furrow made by the latter.

Mounted in the beam 1 is a shaft 18 on which is a lever 19. To this lever are connected, one on each side of its center of movement, chains or cables 20, which after passing about a guide pulley 21 on the bearings 9, are connected with a bracket 22 secured to the upper ends of the standards 8 of the gage wheels 6. By swinging this lever in one direction, the wheel standards 8 are forced down, with a pressure on the wheels 6 against the ground, sufficient to lift the harrow-frame, and thereby raise the harrow-disks 10 from the ground. When the lever is moved in the opposite direction, the harrow-frame will be lowered and the disks will return to the ground.

Upon the shaft 18 is loosely mounted a second lever 23, which is connected with the link 13 by a yoke A formed at the end of a lateral extension B of the link and said link joins the crank arms 12 of the disk standards 11, so that by operating the lever 23 the disks 10 may be turned to their functionally operative opposite inclinations. Upon the shaft 18 is also loosely mounted a third lever 24, which is connected by links 25 with crank-arms 26 on the tops of the gage-wheel-standards 8. By operating this lever, the wheels 6 may be turned to their opposite inclinations, to conform to the angles of the disks 10.

The construction of the harrow will be better understood by a description of its operation, which is as follows: As before stated, the harrow is intended to operate on sidehills, and, instead of traveling in a continuous course around the field, is designed to return upon its course, to make a furrow on its return path adjacent to that which it made on its outward path. With this in view, the several disks and wheels are made reversible. Suppose the harrow be about to start at the lower edge of the hill-side field. The draft-bar 15 is suitably adjusted and locked in its position. The disks 10 are so turned, by means of the lever 23, that they will turn the earth, by gravity, down the slope; and the two gage-wheels 6 are suitably turned, by means of the lever 24, to conform to their adjacent harrow-disks. Then the harrow-frame is lowered, by means of the lever 19, to its proper depth, and a start is made. When the end of the furrow is reached, the harrow is raised by lever 19 so that its disks 10 clear the ground. The disks are then reversed, by lever 23, and the wheels 6 are likewise reversed, by lever 24. The draft-bar 15 is unlocked and is moved to the opposite end of the draft-rail 14, and is there locked. Now, after the whole harrow is swung up the hill one space or line of travel, it is lowered to position, a start on the return is made, and a second furrow is made adjacent to and parallel with the first; and so on.

Having thus described the invention, what is claimed as new and desired to be protected by Letters Patent is—

1. A reversible gang disk harrow comprising a frame including a carrying beam, a plurality of disks provided with standards mounted for rotation in the carrying beam, a gage wheel arranged at each end of the carrying beam to support the frame, each gage wheel being provided with a standard mounted in the frame for rotary and vertical adjustment, means for adjusting the disks to position the same for the cutting of furrows on the travel of the harrow in either direction, means for simultaneously adjusting the gage wheels to adapt the same to the travel of the harrow in either direction and means to simultaneously adjust vertically the standards of the gage wheels.

2. A reversible gang disk harrow comprising a frame, a plurality of disks provided with standards mounted for rotation in the frame, gage wheels for supporting the frame, said gage wheels being provided with standards mounted in the frame for rotation and to have a vertical sliding adjustment relative to the frame in the direction of their length, means for simultaneously adjusting the disks to position the same for the cutting of furrows on the travel of the harrow in either direction, means for simultaneously adjusting the standards of the gage wheels vertically and means for simultaneously adjusting the gage wheels to adapt the same to the travel of the harrow in either direction.

3. A reversible gang disk harrow comprising a frame including a straight carrying beam, a plurality of disks provided with standards mounted for rotation in the carrying beam, means for adjusting the disks to position the same for the cutting of furrows on the travel of the harrow in either direction, gage wheels for supporting the frame, said gage wheels being provided with standards mounted in the frame for rotary and vertical sliding adjustment, means for making the rotary adjustment of the standards of the gage wheels simultaneously, said means including cranks secured to said standards, a lever pivoted to the carrying beam and pivotal link connections between the cranks and said lever.

4. A reversible gang disk harrow comprising a frame including a straight carrying beam, a plurality of disks provided with standards mounted for rotation in the carrying beam, means for adjusting the disks to position the same for the cutting of furrows on the travel of the harrow in either direction, gage wheels for supporting the frame, said gage wheels being provided with standards mounted in the frame for rotary and vertical sliding adjustment, means for making the rotary adjustment of the standards of the gage wheels simultaneously, said means including cranks secured to said standards, a lever pivoted to the carrying beam and pivotal link connections between the cranks and said lever, and means for simultaneously effecting the vertical adjustment of the standards of the gage wheels.

5. A reversible gang disk harrow comprising a frame, a plurality of disks mounted in the frame, gage wheels for supporting the frame, said gage wheels being provided with standards mounted in the frame for rotation and to have a vertical sliding adjustment relative to the frame in the direction of their length, means for simultaneously adjusting the standards of the gage wheels vertically and means for adjusting the gage wheels to adapt the same to the travel of the harrow in either direction.

In testimony whereof I have signed my name to this specification in the presence of two subscribing witnesses.

HANS CHRISTENSEN.

Witnesses:
S. FRISK,
L. G. PLUMLEY.